United States Patent [19]

Léveques

[11] 4,387,883
[45] Jun. 14, 1983

[54] CHANGEOVER DEVICE FOR AN INSTALLATION FOR RECOVERY OF THE GASES AND FUMES PROCEEDING FROM A CONVERTER

[75] Inventor: Marc Lévêques, Moint-par-Montbrison, France

[73] Assignee: Clesid S.A., Saint-Chamond, France

[21] Appl. No.: 311,720

[22] Filed: Oct. 15, 1981

[30] Foreign Application Priority Data

Nov. 21, 1980 [FR] France .................. 80 24741

[51] Int. Cl.³ .................................... C21C 5/40
[52] U.S. Cl. .................... 266/158; 266/159; 266/147
[58] Field of Search .............. 266/158, 159, 147; 137/248; 98/115

[56] References Cited

U.S. PATENT DOCUMENTS

| | | | |
|---|---|---|---|
| 1,871,943 | 8/1932 | Atwell | 137/248 |
| 2,098,553 | 11/1937 | Reiner | 137/309 |
| 2,253,594 | 8/1941 | Wilson | 137/248 |
| 2,821,504 | 1/1958 | Doll | 202/262 |
| 3,170,017 | 2/1965 | Namy | 266/155 |
| 3,972,708 | 8/1976 | Baum | 75/60 |
| 4,031,819 | 6/1977 | Applewhite | 98/115 R |
| 4,128,320 | 12/1978 | Maubon | 266/89 |
| 4,168,824 | 9/1979 | Nagati | 266/158 |
| 4,200,263 | 4/1980 | Laimer | 266/142 |

Primary Examiner—L. Dewayne Rutledge
Assistant Examiner—Christopher W. Brody
Attorney, Agent, or Firm—Pollock, Vande Sande & Priddy

[57] ABSTRACT

A changeover device for an installation for recovery of the gases proceeding from a tilting converter placed in an enclosure connected to a fixed suction duct called the main suction duct. The main suction duct enables recovery of the gases which escape from the converter in the vertical position for blast. A secondary duct connected to one and the same suction device as the main duct enables the recovery of the gases in the converter in the inclined position for charging. The changeover device enables the suction to be exerted either in the main duct or in the secondary duct. It comprises a suction chamber having two superposed portions connected by a vertical junction duct projecting into the upper portion of the chamber. Around the junction duct there is a tank containing water. A vertically movable bell plunges into the tank in order to isolate the two portions of the chamber with respect to one another. The main duct opens out into the lower portion of the chamber, whereas the secondary duct opens out into the upper portion of the chamber. A closure valve is placed in the main suction duct upstream of the chamber in two portions.

6 Claims, 2 Drawing Figures

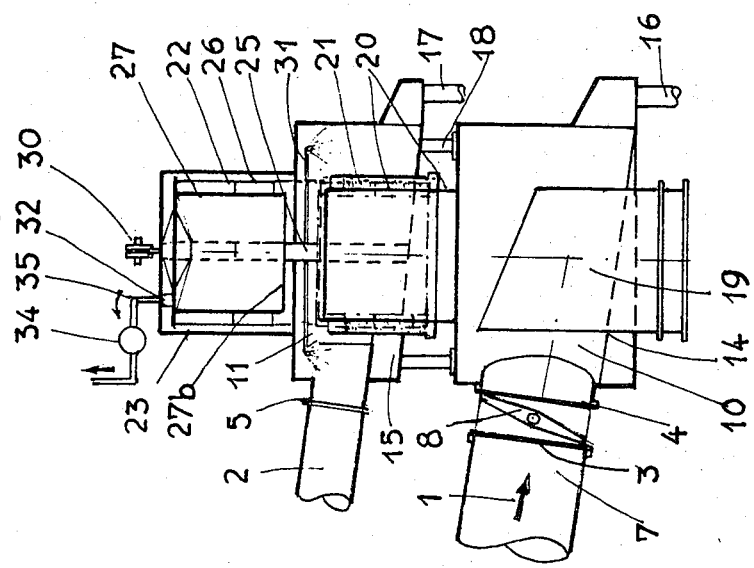
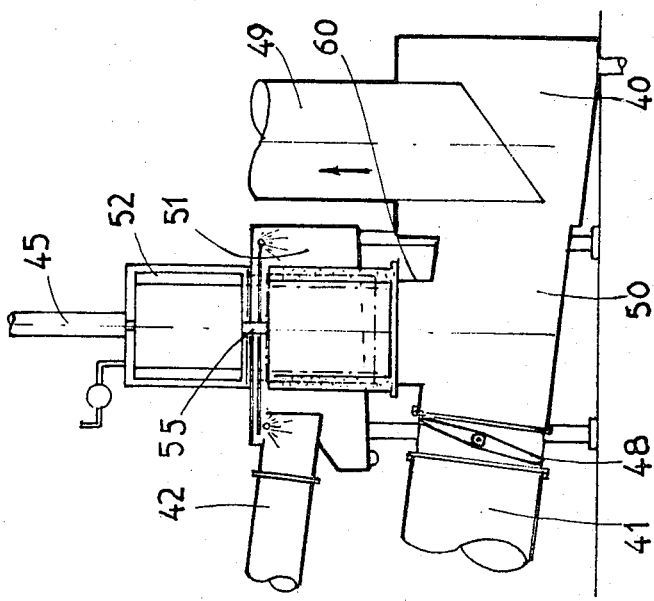

CHANGEOVER DEVICE FOR AN INSTALLATION FOR RECOVERY OF THE GASES AND FUMES PROCEEDING FROM A CONVERTER

BACKGROUND OF THE INVENTION

The invention relates to a changeover device for an installation for recovery of the gases and fumes proceeding from a tilting converter.

French Pat. No. 2,366,366 and corresponding U.S. Pat. No. 4,128,230 a device which enables the recovery of the gases and fumes proceeding from a converter which tilts about a horizontal axis, whether this converter is in vertical or inclined position, i.e., during refining of the steel contained in the converter and during charging with melt or with scrap or during pouring of the steel, respectively.

It is in any case necessary to recover the gases and fumes escaping from the converter, so as to prevent them from escaping into the atmosphere of the steel plant.

The recovery installation described in the above mentioned patents includes an enclosure having dimensions sufficient to accommodate the tilting movements of the converter, enveloping the latter about at least that portion of it which is situated above the horizontal plane containing the axis of tilt of the converter. The enclosure is equipped with doors to permit charging of the converter, and it is connected to a fixed suction duct situated above the spout of the converter in the vertical position, this duct, or main suction duct, enabling the recovery of the gases escaping into the enclosure when the converter is in its vertical service position. A means for regulating the suction enables solely the gases escaping from the converter to be drawn off, to the exclusion of the air which may penetrate into the enclosure.

On the contrary, when the converter is in inclined position, the suction regulating means remains in a fixed position, i.e., the position which corresponds in general with maximum suction.

Certificate of Addition No. 2,402,708 to French No. 2,366,366, also discloses a recovery device which includes, besides the main suction duct connected to the enclosure, a secondary suction duct generally connected to a hood situated outside the enclosure and underneath which the spout of the converter is disposed in inclined position, permitting the recovery of the gases at the time of charging the converter.

The main duct and the secondary duct are connected to one and the same suction device by way of a changeover device which enables the suction to be exerted either through the main duct or the secondary duct.

At the time of tilting of the converter the changeover device must be manipulated in order to place the secondary suction duct into service. The changeover device must therefore be extremely reliable in operation and must enable very good isolation of the secondary suction duct with respect to the main suction duct even in the case of poor operation of the control mechanism for the changeover device.

The very large size of the suction ducts employed for the recovery of converter gases demands on the other hand the employment of closure pieces which are themselves of very large dimensions, for the formation of the changeover device. Hitherto valves or dampers have not been known which enable the functions detailed above to be fulfilled under the best conditions.

SUMMARY OF THE INVENTION

The object of the invention is a changeover device for an installation for recovery of the gases and fumes proceeding from a tilting converter, including an enclosure of dimensions sufficient accommodate the tilting movements of the converter, enveloping the latter about at least that portion of it which is situated above the horizontal plane containing the axis of tilt when the converter is vertical, a first fixed suction duct, called the main suction duct, joined to the enclosure and connected to a device enabling a suction to be exerted in the enclosure in which the gases escape from the converter, and a second fixed suction duct called the secondary duct, connected to the same suction device as the main duct by way of the changeover device, the latter having to be extremely reliable in operation and having to enable very good isolation of the main suction duct with respect to the secondary suction duct.

The changeover device comprises:

(a) a suction chamber having two superposed portions connected through a vertical junction duct projecting into the upper portion of the chamber, around which is arranged an annular tank containing water, the main duct opening out into the lower portion of the chamber and the secondary duct into the upper portion of the chamber;

(b) a cylindrical bell movable inside the upper portion of the chamber between a low position in which the bell is plunged into the annular tank surrounding the junction duct and isolates the upper portion from the lower portion of the chamber, and a high position in which the bell is disengaged from the annular tank, the two portions of the chamber then being in communication;

(c) a device for movement of the bell between its low position and its high position; and (d) and a closure valve in the main suction duct before the chamber in two portions of which the lower portion is connected to the suction device.

In order that the invention may be thoroughly understood, two embodiments of the changeover device for a recovery installation in accordance with the invention will now be described with reference to the accompanying drawings.

BRIEF DESCRIPTION OF THE DRAWINGS

FIG. 1 represents in section through a vertical plane of symmetry a first embodiment of the changeover device.

FIG. 2 represents in section through a vertical plane of symmetry a second embodiment of the changeover device.

DETAILED DESCRIPTION

FIG. 1 shows two ducts 1 and 2 of large diameter, which constitute respectively the main suction duct connected to the hood and to the main recovery flue, arranged above the spout of the converter in the vertical position, and the secondary suction duct connected to the means of recovery of the fumes from the converter in the sloping position for charging, for example, a movable skirt and a recovery hood as described in the French Application for a Certificate of Addition No. 2,402,708.

The ends of the ducts 1 and 2 connected to the means for recovering the gases from the converter have not been represented in FIG. 1.

The opposite ends of these ducts are connected to the changeover device by way of flanges 3 and 4 in the case of the duct 1, and of a flange 5 in the case of the secondary duct 2. The end portion 7 of the duct 1 forms the saturator for the gases, means for introducing water into this portion of the duct enabling them to be saturated with moisture.

Arranged between the flanges 3 and 4 is a butterfly valve 8, the closure of which is not entirely gas-tight and which includes in its lower portion a notch for the flow of the water from the saturator towards the expansion chamber 10 into which the duct 1 opens.

The ducts 1 and 2 slope slightly downwards in the direction of flow of the gases, at the level of their end portions in the vicinity of the changeover device.

The expansion chamber 10 into which the duct 1 opens forms the lower portion of a chamber of two superposed portions 10 and 11.

The duct 1 is connected to the upper portion 11 of the chamber.

The two portions forming each of chambers 10 and 11 include a lower sloping wall, (14 and 15 respectively) and a pipe stub (16 and 17 respectively) for the water to flow out at their lowest points.

The upper chamber 11 is connected to the lower expansion chamber 10 by way of vertical supports 18.

The expansion chamber 10 is in communication with the downstream portion of the circuit for recovery of the gases, by way of a vertical duct 19 which passes through the lower wall of the chamber 10 and includes a portion projecting inside the latter to enable the recovery of the gases in the upper portion of the chamber.

The duct 19 enables the expansion chamber to be connected to an installation for the removal of dust from the recovered gases.

The expansion chamber is connected at its upper part to a vertical duct 20 directed upwards and opening out inside the upper secondary recovery chamber 11 in order to recover the gases in the upper portion of the latter.

It will be understood that the common device for suction of the gases through the main and secondary ducts is located downstream of the dust-removal device and the suction through the secondary duct 2 is effected by way of the ducts 19 and 20 when the device is in the position of secondary recovery shown in FIG. 1.

Around the duct 20 there is arranged an annular tank 21 filled with water which forms one of the parts of the means ensuring gas-tightness of the closure of the secondary recovery.

The other portion of this device for closure and for gas-tightness consists of a bell 22 which, in the secondary recovery position shown in FIG. 1, is inside a housing 23 forming the upper portion of the chamber 11.

A guide which in the case of FIG. 1 consists of a central column 25 enables the bell to be guided for vertical movement between its high position in the housing 23 and its low position in which the outer sleeve 26 of the bell is immersed in the water filling the annular tank 21. The bell likewise includes an inner sleeve 27 enabling the guidance and the placement of the bell inside the duct 20, as shown in dotted lines in FIG. 1.

The sleeve 27 is closed at its lower end by an end 27b.

When the bell is in the low position the duct 20 is closed, with the result that there is no longer any communication between the two portions 10 and 11 of the chamber of the changeover device. The duct 20 being otherwise entirely shut off by the bell 22 the end 27b of which is closed, the dead volume of the gases remaining in the closure device is not very large.

A winch 30 enables the bell to be moved between its high and low positions.

The chamber 11 is likewise equipped at its upper part with a sprinkler array 31 enabling prewashing of the recovered gases inside the chamber 11.

The device represented in FIG. 2 differs from the device represented in FIG. 1 in that the lower portion 50 of the chamber of the changeover device consists of one portion of the main duct 41 situated downstream of the butterfly 48.

The vertical duct 60 putting this lower portion 50 of the chamber into communication with the upper portion 51 is situated as a tap on the duct 41 at the level of its portion 50.

The secondary duct 42 as previously opens out into the upper portion of the chamber 51.

The bell 52 movable vertically and guided by the columns 55 is moved by a jack 45 which is substituted for the winch 30 of the device represented in FIG. 1.

The portion 50 of the duct 41 opens out into the expansion chamber 40 which in turn is in communication with the downstream portion of the recovery circuit comprising the dust-removal device and the common suction device by way of a vertical duct 49.

Referring to FIG. 1 it may be seen that a ventilation circuit including pipework 35 and a fan 34 is connected to the upper portion of the housing 23 forming the upper portion of the chamber 11. The bell 22 includes a boss 32 on its upper surface, which, when the bell is in the high position as shown in FIG. 1, shuts off the end of the pipe 35 opening into the housing 23.

When the bell is in the low position, suction is exerted in the chamber 11 since the boss 32 has been moved away from the orifice in the pipe 35.

The ventilation circuit therefore allows ventilation of the secondary circuit during the main recovery.

When the bell is in the low position and is closing in a gas-tight manner the end of the vertical duct 20, the common suction device arranged downstream of the changeover device is connected to it by way of the ducting 19 which enables a suction to be exerted in the main duct 1, the butterfly 8 being in the open position.

This position of the bell corresponds with recovery above the convertor in the vertical position.

A damper then enables the suction to be regulated as a function of the pressure differential between the inside and the outside of the enclosure as described in French Pat. No. 2,366,366 and in U.S. Pat. No. 4,128,230.

When the converter it tilted into inclined position for receiving the refined steel and for the charging of the scrap, the bell is put into the low position in which it shuts off the communication duct between the two portions of the chamber of the changeover device.

Simultaneously the butterfly valve 8 or 48 in the main suction duct is moved into closure position by its operating device, which is either pneumatic, hydraulic or mechanical.

As indicated in French Pat. No. 2,366,366 and U.S. Pat. No. 4,128,230, the damper of the suction device is kept in a fixed position during all the operations in which the converter is in inclined position.

When shutoff butterfly in the main duct is in the position of closure, the suction in the main duct is very low, and corresponds solely with a ventilation of this duct, the butterfly valve not being entirely gas-tight.

When the bell is in the high position, communication between the two portions 10 and 11 of the chamber is assured, with the result that the suction in the chamber 11 (or 51) and in the duct 2 (or 42) is assured for carrying out the secondary recovery at the level of a cuff coaxial with the main duct and/or of a hood arranged in a manner offset with respect to the main hood above the charging door of the converter enclosure.

The main advantages of the device according to the invention are to enable extremely simple and extremely reliable manipulation of the changeover member, the rest position of which corresponds with the closure of the secondary portion of the recovery device, and to permit perfectly gas-tight closure of the secondary recovery circuit when the main recovery is in operation.

The invention is not restricted solely to the embodiments which have been described but includes other relative arrangements of the several components forming the recovery circuit with respect to the changeover device.

One may equally well employ other means for the conditioning of the recovered gases than those which have been described in the form of devices for saturation or for prewashing arranged inside the chambers of the changeover device.

Any sort of means may be conceived of for feeding with water these prewash or saturation arrays.

Finally the device according to the invention may be applied to any refining converter including a double system of recovery employable when the converter is in the vertical position and when the converter is in inclined position.

I claim:

1. A changeover device for an installation for recovery of the gases and fumes proceeding from a tilting converter, including an enclosure of dimensions sufficient to accommodate the tilting movements of said converter and enveloping the latter about at least that portion of it which is situated above the horizontal plane containing the axis of tilt when the converter is in its vertical position, a first fixed suction duct called the main suction duct, joined to said enclosure and connected to a suction device enabling suction to be exerted in the enclosure in which the gases escape from said converter, and a second fixed suction duct called the secondary duct for suction above said converter during its pouring or charging phase, connected to the same suction device as the main duct by way of the changeover device which comprises (a) a suction chamber having two superposed upper and lower portions (10 and 11) connected only through a vertical junction duct (20) projecting into said upper portion (11) of said chamber, an annular tank (21) containing water being arranged about said junction duct (20), said main suction duct (1) opening out into said lower portion (10) of said chamber and said secondary duct (2) opening out into said upper portion (11) of said chamber;

(b) a cylindrical bell (22) movable inside said upper portion (11) of said chamber between a low position in which said bell (22) is plunged into said annular tank (21) surrounding said junction duct (20) and isolates completely said upper portion (10) from said lower portion (11) of said chamber, and a high position in which said bell (22) is disengaged from said annular tank (21), said upper and lower chambers (10 and 11) then being in communication;

(c) means (30) for moving said bell between its low position and its high position; and (d) a closure valve (8) in said main suction duct (1) before said chamber the lower portion (10) of which is connected to said suction device.

2. A changeover device according to claim 1, wherein said lower portion (50) of said chamber consists of a portion of said main suction duct (41) onto which is fixed as a tap said junction duct (60) between said upper and lower portions (50 and 51) of said chamber, said portion (50) of said main suction duct (41) opening out into an expansion chamber (40) in communication with said suction device.

3. A changeover device according to claim 1, wherein said lower portion (10) of said chamber forms the chamber for expansion of the recovered gases.

4. A changeover device according to any one of claims 1 to 3, wherein said closure valve (8) in said main suction duct (1) comprises a butterfly valve the shutoff butterfly of which effects only partial closure of said main suction duct in the shut-off position.

5. A changeover device according to any one of claims 1 to 3, wherein said upper portion of said upper chamber (11) forming a housing for said movable bell (22) is connected to a ventilation circuit (34, 35) the opening from which into communication with the bell housing is selectively closable by a boss (32) located on the upper surface of said bell (22).

6. A changeover device according to any one of claims 1 to 3, comprising at least one sprinkler array (31) arranged inside said upper portion 11 of said chamber.

* * * * *